United States Patent [19]
Cowett, Jr.

[11] Patent Number: 5,359,277
[45] Date of Patent: Oct. 25, 1994

[54] LOW DISTORTION ALTERNATING CURRENT OUTPUT ACTIVE POWER FACTOR CORRECTION CIRCUIT USING BI-DIRECTIONAL BRIDGE RECTIFIER AND BI-DIRECTIONAL SWITCHING REGULATOR

[75] Inventor: Philip M. Cowett, Jr., Baltimore, Md.

[73] Assignee: AlliedSignal Inc., Morris Township, Morris County, N.J.

[21] Appl. No.: 862

[22] Filed: Jan. 5, 1993

[51] Int. Cl.$^5$ .............................. H02M 1/12
[52] U.S. Cl. ................... 323/207; 363/39; 363/79
[58] Field of Search ............ 323/207, 205; 363/79, 363/39, 34, 78, 74

[56] References Cited
U.S. PATENT DOCUMENTS

| | | | |
|---|---|---|---|
| 4,647,837 | 3/1987 | Stemmler | 323/207 |
| 4,651,265 | 3/1987 | Stacey et al. | 363/35 |
| 4,677,366 | 6/1987 | Wilkinson et al. | 323/222 |
| 5,047,912 | 9/1991 | Pelly | 363/89 |
| 5,057,990 | 10/1991 | Gulczynski | 363/131 |
| 5,291,119 | 3/1994 | Cowett, Jr. | 323/207 |

OTHER PUBLICATIONS

Micro Linear; "1990 Data Book, Semi-Standard Analog", ML4812 pp. 5-20 through 5-30, Sep. 1989.
Sola, "User's Handbook for the 57 Series"; Nov. 11, 1989, pp. 1-1 through 1-7.
Lloyd H. Dixon, Jr., "High Power Factor Preregulators for Off-Line Power Supplies"; Copyright 1988, pp. 6-1 through 6-16.

Primary Examiner—Kristine L. Peckman
Assistant Examiner—Adolf Berhane
Attorney, Agent, or Firm—Howard G. Massung

[57] ABSTRACT

A circuit wherein a current sensing device is incorporated in an AC input line. An AC output is taken from the output of said current sensing device, and from another AC input line. Circuitry including a bi-directional bridge rectifier followed by a bi-directional switching regulator and an energy storage capacitor adds current to or subtracts current from the instantaneous output load current. The arrangement is such that the AC output is equal to the AC input with no regulation effect. Substantially one hundred percent efficiency results when very little power factor correction is required.

5 Claims, 3 Drawing Sheets

LOW DISTORTION ALTERNATING CURRENT OUTPUT ACTIVE POWER FACTOR CORRECTION CIRCUIT USING BI-DIRECTIONAL BRIDGE RECTIFIER AND BI-DIRECTIONAL SWITCHING REGULATOR

CROSS REFERENCE TO RELATED APPLICATIONS

This application is related to co-pending, commonly assigned U.S. application Ser. Nos. 08/000,864 for a Low Distortion Alternating Current Output Active Power Factor Correction Circuit Using Two Bi-directional Switching Regulators (File NO. 550-92-008), and 08/000,863 for a Low Distortion Alternating Current Output Active Power Factor Correction Circuit Using Capacitor Coupled Bi-directional Switching Regulator (File No. 550-92-009), both of said applications filed on even date herewith by the present applicant.

BACKGROUND OF THE INVENTION

Direct current (DC) output active power factor correction circuits are known in the art. However, prior to the present invention, alternating current (AC) output active power factor correction circuits were not considered viable. Accordingly, this invention relates to modifying the prior art DC circuits to provide an AC output.

In DC output circuits of the type described, a bulk energy storage capacitor is used and charging current into the bulk energy storage capacitor is proportional to the square of the instantaneous AC input line voltage. The current extracted from the AC line is proportional to the instantaneous AC line voltage.

In operation, the AC input or line voltage is full wave rectified by a diode bridge rectifier to provide a rectified sine wave or unfiltered DC output. This output is applied to the input of a switching regulator which is typically a boost converter having an output which is greater than the highest peak input voltage. The feedback loop which regulates the output voltage is modified by adding circuitry to multiply the output of its error amplifier by a sample of the rectified AC input voltage, and comparing this with the sensed current. The resultant signal is used to control the instantaneous duty-cycle of the switching regulator. This causes the input current waveform to follow the input voltage waveform, resulting in low harmonic distortion and a current waveform which is in phase with the voltage waveform.

In order to provide an AC output, the arrangement described above is modified in accordance with the present invention as will be hereinafter described and features a bi-directional bridge rectifier followed by a bi-directional switching regulator. This is in contrast to the arrangement disclosed and claimed in the aforenoted U.S. application Ser. No. 08/000,864 (File No. 550-92-008) which features two bi-directional switching regulators for providing the AC output, and to the arrangement disclosed and claimed in the aforenoted U.S. application Ser. No. 08/000,863 (File No. 550-92-009) which features a capacitor coupled bi-directional switching regulator for providing said AC output.

SUMMARY OF THE INVENTION

This invention contemplates a low distortion AC output active power factor correction circuit wherein a current sensing device is incorporated in an AC input line. The AC output is taken from the output of said current sensing device, and from an other AC input line. Circuitry including a bi-directional bridge rectifier followed by a bi-directional switching regulator and an energy storage capacitor monitors the instantaneous input current and voltage, and causes current to be added to or subtracted from the external load current to produce an input current which is proportional to the input voltage. The energy storage capacitor provides an auxiliary regulated DC output which may be utilized if desired. With an arrangement of the type described, an AC output voltage is provided which is equal to the input voltage (no regulation effect). Substantially one hundred percent efficiency results when very little power factor correction is required, since the load current flows through only the current sensing device.

DETAILED DESCRIPTION OF THE INVENTION

Figure 1:
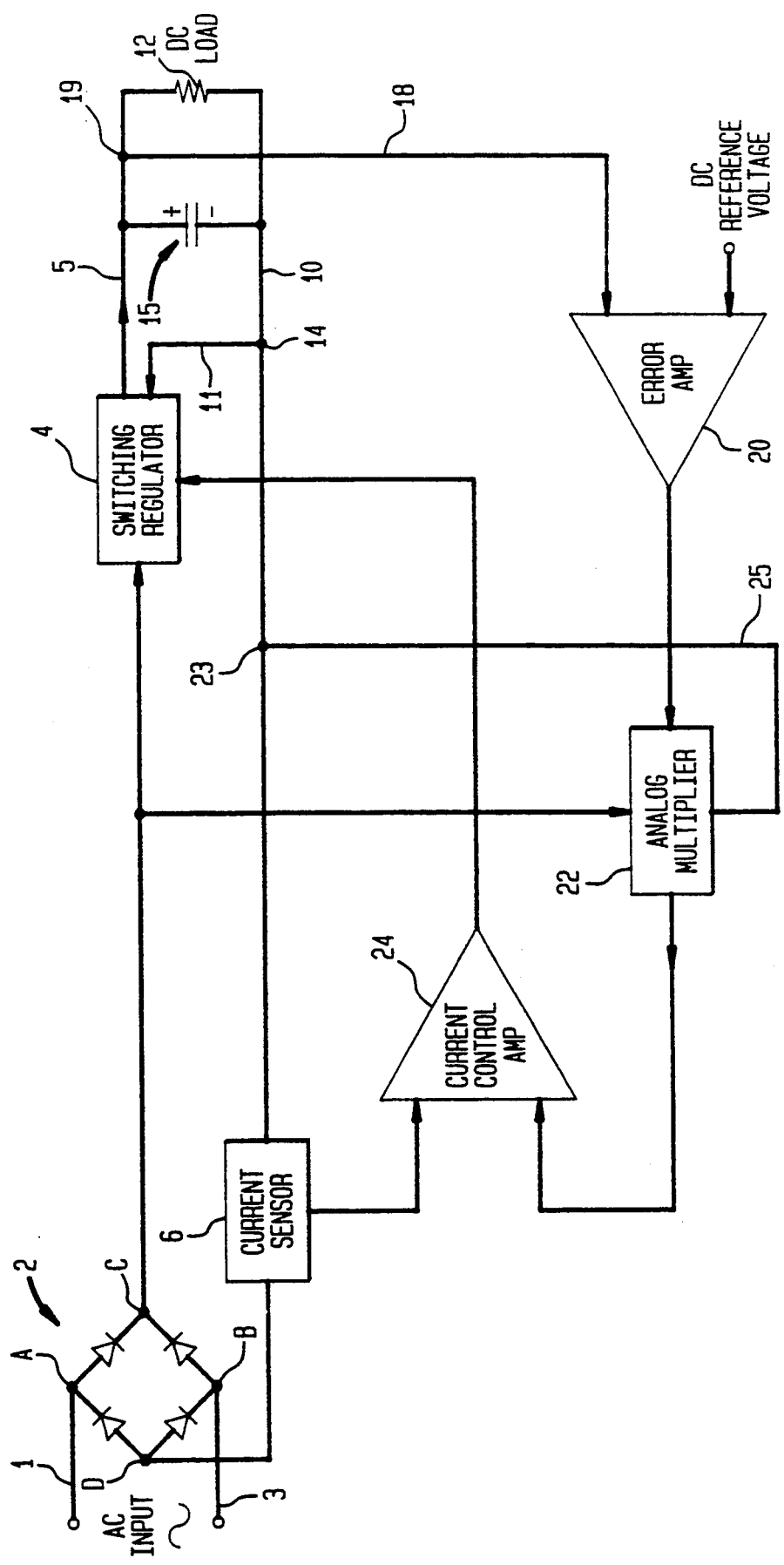
FIG. 1 is an electrical schematic diagram illustrating a prior art DC output power factor correction circuit.

With reference to the prior art circuit shown in FIG. 1, an AC input voltage across input lines 1 and 3 is applied to input terminals A and B of a full wave diode bridge rectifier 2. Bridge rectifier 2 provides a rectified sine voltage output at output terminals C and D thereof.

The output voltage at output terminal C of rectifier 2 is applied to a switching regulator 4 which may be a conventional unidirectional boost converter. The output of bridge rectifier 2 at output terminal D is applied to a current sensor 6.

Switching regulator 4 is connected to an output conductor 8 and current sensor 6 is connected to an output conductor 10. A DC load 12 is connected across conductors 8 and 10. The output from current sensor 6 is applied to switching regulator 4 via conductor 10 and a conductor 11 connected to conductor 10 at a circuit point 14.

A bulk energy storage capacitor 15 is connected across conductors 8 and 10 between circuit point 14 and DC load 12.

A conductor 18 is connected to conductor 8 at a circuit point 19 between capacitor 15 and DC load 12, and is connected to an error amplifier 20. A DC reference voltage is applied to error amplifier 20 which provides an output corresponding to the difference between the input thereto applied via conductor 18 and the reference voltage. The difference output is applied to an analog multiplier 22. Analog multiplier 22 is connected to conductor 10 at a circuit point 23 via a conductor 25.

The output at output terminal C of bridge rectifier 2 is applied to analog multiplier 22. The analog multiplier provides an output which is applied to a current control amplifier 24, as is the output from current sensor 6. Current control amplifier 24 provides an output which is applied to switching regulator 4.

In the circuit shown in FIG. 1, the charging current into bulk energy storage capacitor 15 is proportional to the square of the instantaneous line voltage across AC input lines 1 and 3. The current extracted from the AC input lines is proportional to the instantaneous line voltage.

In operation, the AC input to bridge circuit 2 is full wave rectified by the bridge circuit and the bridge circuit output is in the form of a rectified sine wave, i.e. an unfiltered DC. The unfiltered DC output is applied to the input of switching regulator 4 and a feedback loop including current control amplifier 24 regulates the output from the switching regulator. The feedback loop is modified by multiplying the output of error amplifier 20 by the output at output terminal C of bridge rectifier 2 via analog multiplier 22 and comparing this via current control amplifier 24 with the sensed current from current sensor 6. This causes the input current waveform to follow the input voltage waveform, resulting in low harmonic distortion and a current waveform which is in-phase with the voltage waveform.

Figure 2:
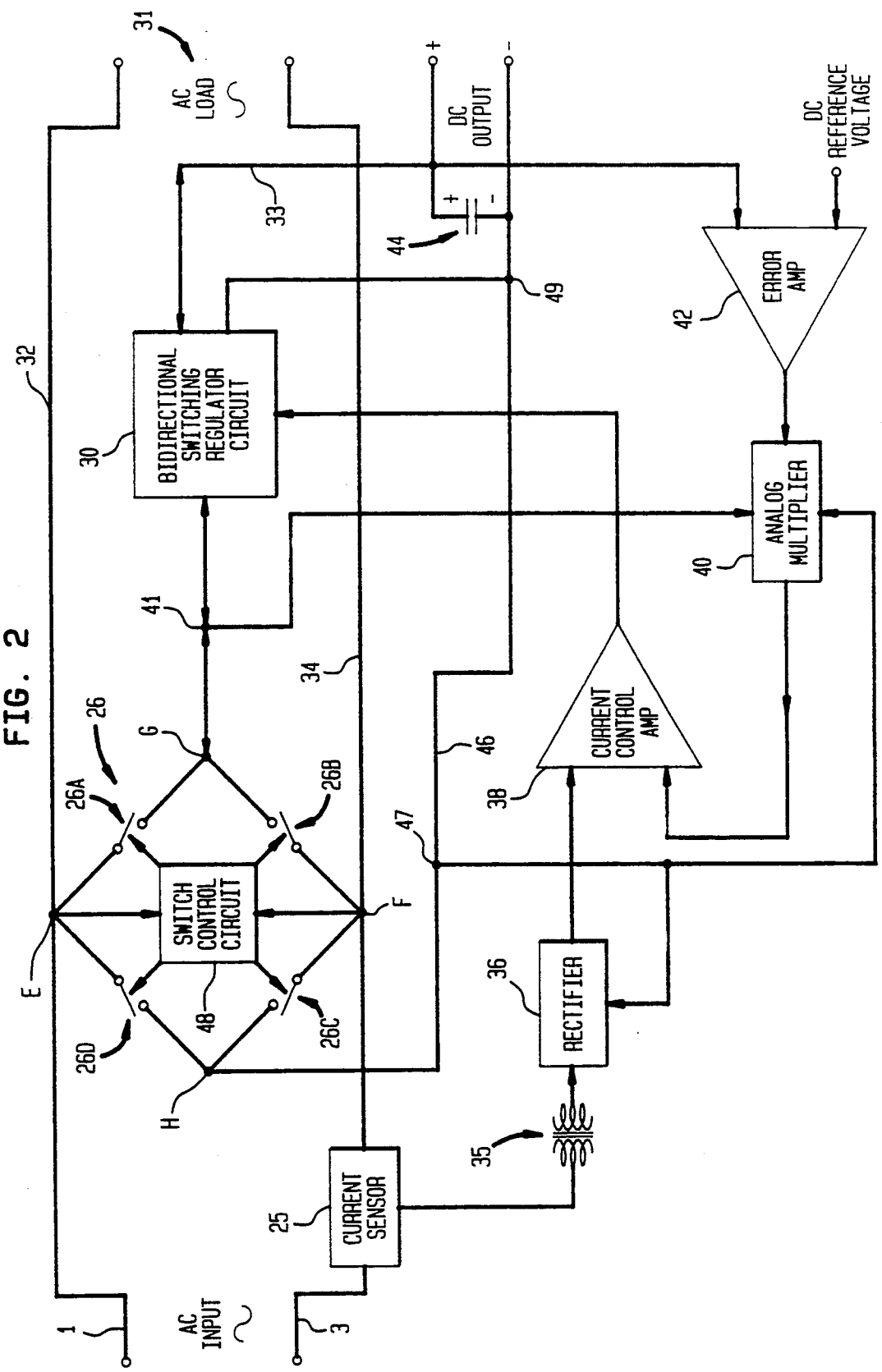
FIG. 2 is an electrical schematic diagram illustrating the invention.

The prior art circuit shown in FIG. 1 is modified as shown in FIG. 2 to provide an AC output in accordance with the present invention, as will be next described With reference then to FIG. 2, the AC input voltage across input lines 1 and 3 is applied to an input terminal E of a bridge circuit 26 and is applied through a current sensor 28 to an input terminal F of bridge circuit 26. An output terminal G of bridge circuit 26 is connected to a bi-directional switching regulator circuit 30. An AC load 31 is connected across a conductor 32 leading from bridge terminal E and a conductor 34 leading from bridge terminal F.

The output from current sensor 28 is applied to an isolation transformer 35 and therefrom to a rectifier 36. The output from rectifier 36 is applied to a current control amplifier 38. The output at output terminal G of bridge circuit 26 is applied to a single-quadrant analog multiplier 40 and the output from the multiplier is applied to current control amplifier 38.

The output from bi-directional switching regulator circuit 30 at an output conductor 33 is applied to an error amplifier 42. A DC reference voltage is applied to amplifier 42 which provides an output corresponding to the difference between the input applied via conductor 33 and the reference voltage.

The difference output is applied to analog multiplier 40, whereby the analog multiplier provides the output which is applied to current control amplifier 38. The output from current control amplifier 38 is applied to bi-directional switching regulator circuit 30 for controlling the regulator circuit as will hereinafter be further described.

A bulk energy storage capacitor 44 is connected to conductor 33 and is connected to a conductor 46 leading from output terminal H of bridge circuit 26. A DC output is provided across capacitor 44.

Rectifier 36 and analog multiplier 40 are connected to conductor 46 at a circuit point 47. Analog multiplier 40 is connected at a circuit point 41 between output terminal G of bridge circuit 26 and bi-directional switching regulator circuit 30. Bi-directional switching regulator circuit 30 is connected to conductor 46 at a circuit point 49.

In operation, the circuit of the invention as shown in FIG. 2 takes an output from terminals E and F of bridge circuit 26 instead of from the bulk energy storage capacitor, as is the case with the prior art circuit of FIG. 1. Current sensor 28 is interposed in AC input line 3 before bridge circuit 26 to monitor load current. This requires that the output of current sensor 28 be isolated and rectified as accomplished by isolation transformer 35 and rectifier 36.

In order to allow for four quadrant operation, i.e. to allow for current to be applied to the AC input lines as well as to be extracted from said lines, bridge circuit 26 includes driven switches 26A, 26B, 26C and 26D, rather than diodes, as is the case in the prior art circuit of FIG. 1. Each of the switches is connected in a leg of the four legs of the bridge circuit. These switches, which may be transistors such as MOSFETS or IGBTS, are driven by a switch control circuit 48 connected to input terminals E and F of bridge circuit 26, to be opened and closed so that circuit 26 acts like a bridge rectifier except that it is bi-directional. Since voltage and current are in phase by definition (since the circuit of FIG. 2 corrects power factor), this is a simpler arrangement and is preferred over other arrangements such as, for example, utilizing four DC to DC converters with two bulk capacitors, or using two bi-directional DC to DC converters and two bulk capacitors, either of which would eliminate the need for a bi-directional input rectifier. However, controlling such a circuit would not be as simple and the circuit transformation procedure would be less straightforward than that accomplished by using circuit 26 as shown in FIG. 2.

Figure 3:
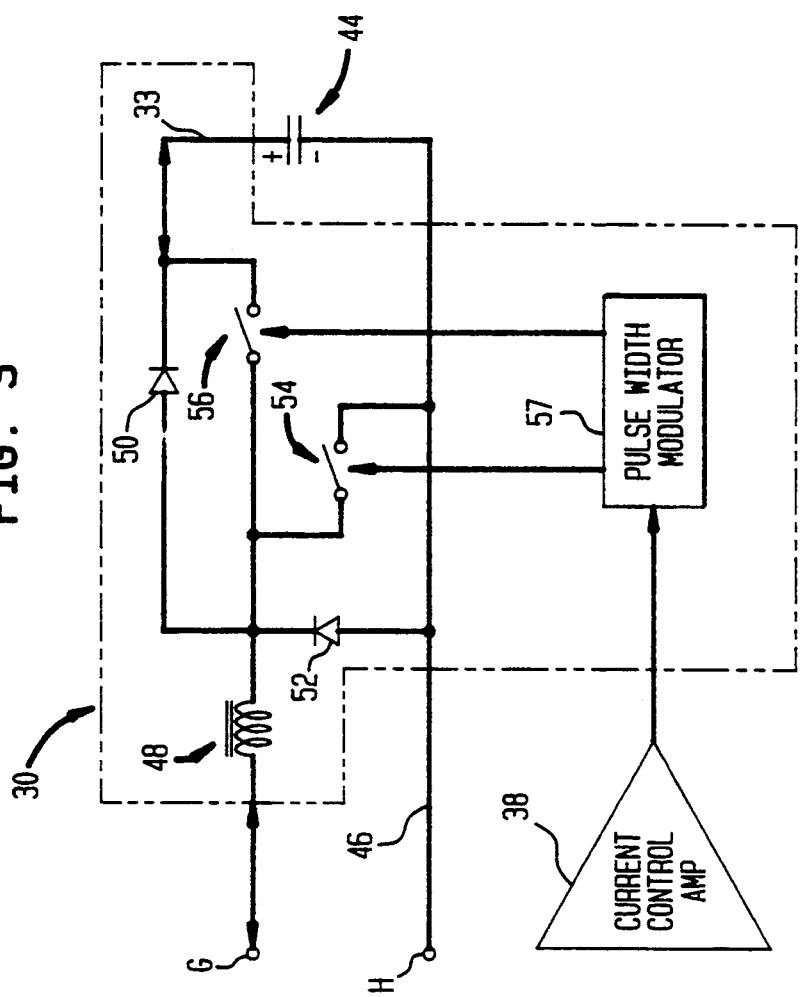
FIG. 3 is an electrical schematic diagram illustrating a bi-directional boost converter or switching regulator such as may be used in the invention as shown in FIG. 2.

In regard to bi-directional switching regulator circuit 30 shown generally in FIG. 2, the regulator circuit can be, for purposes of illustration, a bi-directional boost converter circuit as shown in FIG. 3. However, it is to be noted that other circuitry such as buck or flyback circuitry can be used as well.

Thus, using the bi-directional boost converter circuitry of FIG. 3 as an example, the input to bi-directional switching regulator or boost converter circuitry 30 is from terminal G of bridge circuit 26 and therefrom via an inductor 48 and a diode 50 included in the switching regulator, and via conductor 33 to bulk energy storage capacitor 44. Output terminal H of bridge circuit 26 is connected to capacitor 44 via conductor 46 as described with reference to FIG. 2.

Switching regulator circuitry 30 includes a diode 52 and a switch 54 connected in parallel across capacitor 44 between inductor 48 and diode 50. A switch 56 is connected across diode 50. A pulse width modulator 57 controlled by current control amplifier 38, drives switches 54 and 56.

With the arrangement shown in FIG. 3, current control amplifier 38 controls regulator circuitry 30 so that one switch of switches 54 and 56, such as switch 56 as shown in the Figure, is closed by the output of pulse width modulator 57 and the other switch, such as 54, is simultaneously opened by a complementary output of pulse width modulator 57. This effects operation in a continuous mode at all times, as will now be discerned.

It will be appreciated by those skilled in the art that the circuit shown in FIG. 3 could be made to operate in a discontinuous mode, but this would require a more complex control arrangement. It is to be noted that the circuitry of FIG. 3 operates as a conventional boost converter for currents flowing into bulk energy storage capacitor 44, and as a buck converter for currents flowing out of the capacitor.

It will now be appreciated that the invention as described and shown with reference to FIG. 2 has distinct advantages. For example, an output voltage equal to the input voltage is provided (no regulation effect). Totally failsafe operation can be accomplished if fuses and circuit breakers are strategically located and if current sensor 28 is sufficiently rugged (e.g. a one turn transformer primary of No. 12 wire in series with AC input line 3). Further, no inherent energy storage is realized. That is to say, the output disappears at the instant the input disappears.

With further reference to FIG. 2, an optional or auxiliary DC output which can be of use if DC outputs as well as AC outputs are required can be accomplished. This is provided by taking the DC output across capacitor 44 as shown in the Figure. There is inherent energy storage at this output.

Additionally, substantially one hundred percent efficiency when little power factor correction is required will be realized. In this regard, note that the load current does not flow through either bridge circuit 26 or bi-directional switching regulator 30.

It will be appreciated that AC load 31 could have a leading or lagging power factor, or can be an in-phase but pulsed load, such as those representative of uncorrected switching power supplies. While the design of the circuit shown in FIG. 2 could be optimized for a specific type of load, the invention herein described is of a generic nature and is capable of handling a load of any type.

With the above description of the invention in mind, reference is made to the claims appended hereto for a definition of the scope of the invention.

What is claimed is:

1. A low distortion alternating current output active power factor correction circuit comprising:
    bi-directional bridge means having a pair of input terminals and a pair of output terminals, said means arranged to be effective as a rectifier;
    bi-directional regulating means connected to one of the pair of output terminals of the bi-directional bridge means and providing an output at an output conductor thereof;
    an other output conductor connected to the other of the pair of output terminals of the bridge means;
    a bulk energy storage capacitor connected to the output conductor of the bi-directional regulating means and the other output conductor connected to the other of the pair of output terminals of the bi-directional bridge means, with a direct current output being provided across the capacitor;
    a pair of alternating current input lines;
    one of the pair of alternating current input lines connected to one of the pair of input terminals of the bi-directional bridge means;
    a current sensor;
    the other of the pair of alternating current input lines connected to the current sensor, whereby the current sensor provides an output at an output conductor which is applied to the other of the pair of input terminals of the bi-directional bridge means;
    a power factor corrected alternating current output being provided across the one and the other of the pair of input terminals of the bi-directional bridge means for being applied to an alternating current load;
    an error amplifier connected to the output conductor of the bi-directional regulating means for receiving the output from said regulating means;
    a reference input received by the error amplifier;
    the error amplifier providing an output corresponding to a difference between the regulating means output and the reference input received thereby;
    a multiplier connected to the one of the pair of output terminals of the bi-directional bridge means between said terminal and the bi-directional regulating means and connected to the error amplifier, and responsive to the outputs therefrom for providing a multiplied output;
    current control amplifier means connected to the multiplier and to the current sensor and responsive to the outputs therefrom for providing a controlling output, said current control amplifier means including an isolation transformer connected to the current sensor, a rectifier connected to the isolation transformer, a current control amplifier connected to the rectifier and providing the controlling output, and the bi-directional regulating means connected to the current control amplifier for being controlled by the controlling output therefrom;
    the bi-directional regulating means connected to the current control amplifier means for being controlled by the controlling output therefrom; and
    said bi-directional regulating means including inductor means connected to the one of the pair of output terminals of the bi-directional bridge means and first current flow control means connected to the other of the pair of output terminals of the bi-directional bridge means, first switching means connected across the first current flow control means, second current flow control means and second switching means connected in parallel, and means connected to the current control amplifier and controlled thereby for driving the first and second switching means, whereby one of the first and second switching means is rendered open when the other of said first and second switching means is simultaneously rendered closed.

2. A circuit as described by claim 1, wherein the bi-directional bridge means includes:
    a first leg connected to one of the pair of input terminals and one of the pair of output terminals;
    a second leg connected to the one of the pair of output terminals and the other of the pair of input terminals;
    a third leg connected to the other of the pair of input terminals and to the other of the pair of output terminals;
    a fourth leg connected to the other of the pair of output terminals and to the one of the pair of input terminals;
    first, second, third and fourth switching means, each of which is connected in one of the first, second, third and fourth legs, respectively; and
    control means connected to the one and the other of the pair of input terminals of the bi-directional bridge means and connected to the first, second, third and fourth switches for opening and closing said switches, whereby said bridge means is effective as a bi-directional rectifier.

3. A circuit as described by claim 1, wherein the bi-directional bridge means includes:
    a first leg connected to one of the pair of input terminals and one of the pair of output terminals;
    a second leg connected to the one of the pair of output terminals and the other of the pair of input terminals;
    a third leg connected to the other of the pair of input terminals and to the other of the pair of output terminals;

a fourth leg connected to the other of the pair of output terminals and to the one of the pair of input terminals;

first, second, third and fourth switching means, each of which is connected in one of the first, second, third and fourth legs, respectively; and control means connected to the one and the other of the pair of input terminals of the bi-directional bridge means and connected to the first, second, third and fourth switches for opening and closing said switches, whereby said bridge means is effective as a bi-directional rectifier.

4. A circuit as described by claim 1, wherein:

the rectifier and the analog multiplier are connected to the other of the pair of output terminals of the bi-directional bridge means.

5. A circuit as described by claim 1, wherein:

the multiplier is a single-quadrant analog multiplier.

* * * * *